June 22, 1954
L. G. WELLER
2,681,748
SELF-UNLOADING BIN
Filed May 27, 1952
2 Sheets-Sheet 1
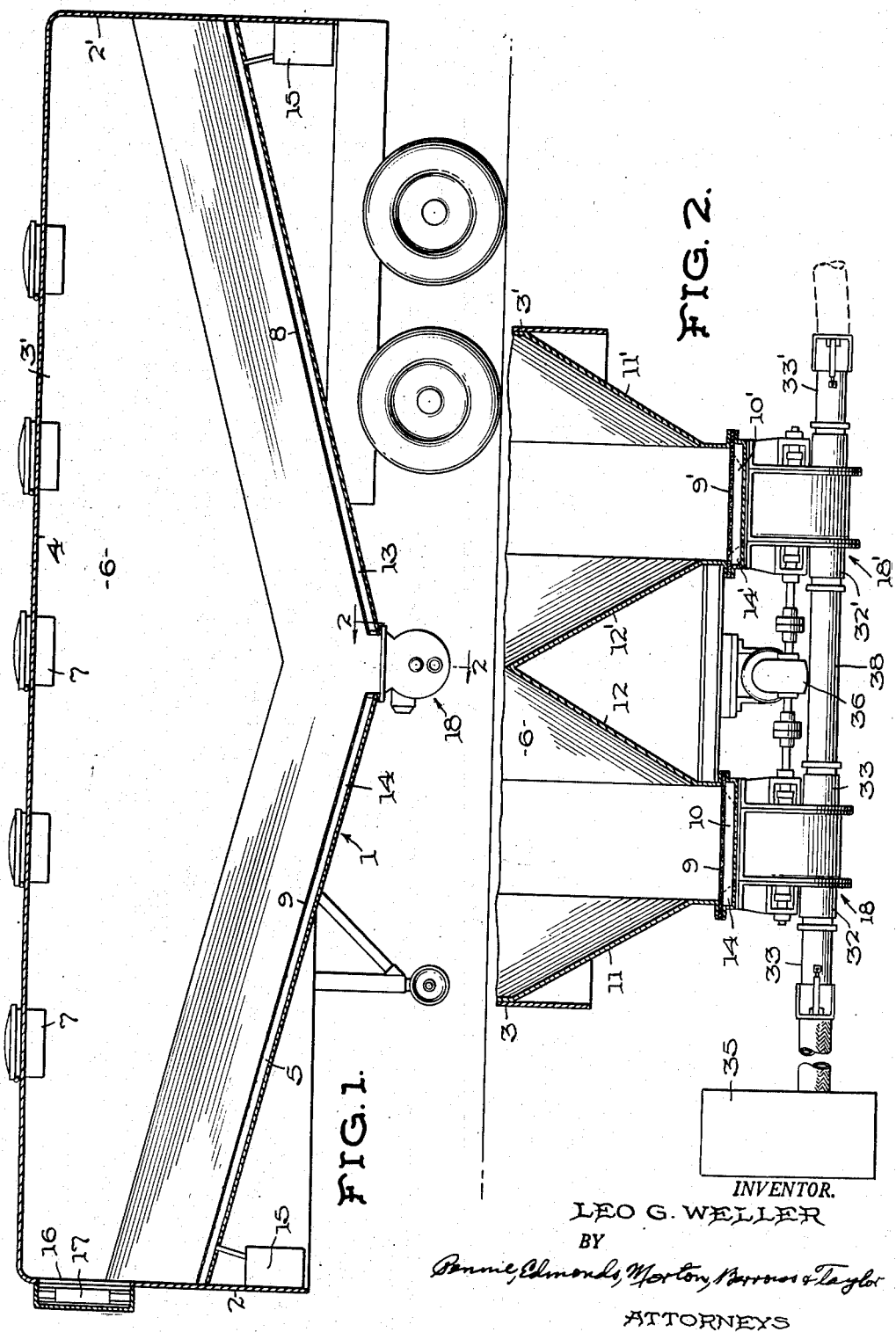
INVENTOR.
LEO G. WELLER
BY
Pennie, Edmonds, Morton, Barrows & Taylor
ATTORNEYS INVENTOR.
LEO G. WELLER
BY
Pennie Edmonds, Morton, Barrows & Taylor
ATTORNEYS Patented June 22, 1954

2,681,748

UNITED STATES PATENT OFFICE 2,681,748

SELF-UNLOADING BIN

Leo G. Weller, Catasauqua, Pa., assignor to
Fuller Company, Catasauqua, Pa.

Application May 27, 1952, Serial No. 290,356

10 Claims. (Cl. 222—195)

This invention relates to apparatus for storing and discharging pulverulent material, and particularly to mobile storage carriers and means associated therewith for discharging substantially dry, finely-divided material from them.

The apparatus of the invention is especially designed for conveying and discharging large quantities of pulverulent materials, such as flour and other pulverulent food products, dry finely-divided chemicals, and other finely-divided materials, especially those which do not flow freely from ordinary storage receptacles.

It is well known that it is difficult to discharge flour from a large receptacle without expensive and complicated apparatus.

Accordingly, it has been customary in the past to load the flour from storage bins at the mills into large bags, and to transport the bags to the various places where the flour is to be used, which places are frequently at substantial distances from the mills. It is desirable to avoid the added operation of loading the flour into bags because of the cost of the operation itself, the cost of the bags, and the danger of contamination of the flour during the loading procedure. Apparatus has previously been designed to discharge flour from vehicles, but such apparatus has been objectionable because of waste of the flour, dusting by the material of the area around the vehicle during the discharge operation, the high expense of the apparatus itself, the necessity for especially designing and constructing the vehicles and the apparatus, thus resulting in relatively high cost of the vehicles and apparatus, and the inconvenience of applying the discharge apparatus to the vehicles when a discharge operation is to take place.

This invention provides apparatus associated with a vehicle, such as a truck trailer, which is capable of discharging flour from such a vehicle at a minimum of expense and wastage of material, which apparatus is also capable of convenient and relatively easy connection to the vehicle at any place where a discharge operation is to be effected.

In transporting certain dry chemicals, it previously has been necessary that they first be stored in small containers before they could be shipped to the remote locations at which they are to be used, because of the deficiencies in known methods for transporting such chemicals in bulk, and particularly because of wastage of the chemicals and deposit of them in undesirable places. For instance, it was extremely difficult to completely discharge the chemicals from the storage vehicle, so that deposits of material were usually left in the vehicle after discharge. Not only did wastage of the material result from this circumstance, but also it was not feasible to transport different chemicals at different times in the vehicles because of contamination of one chemical by the deposits left from another chemical carried in an earlier transporting operation.

The apparatus of the present invention is designed to discharge pulverulent material, such as adipic acid, from a large mobile bin or container, such as a truck trailer, without permitting any appreciable wastage or contamination of the material, and without permitting deposits of material to remain in the bin after the material is discharged therefrom.

The apparatus of the present invention comprises generally a mobile bin having walls defining an enclosed storage space, an outlet port at the bottom of said bin, and a rotary feeder positioned opposite the outlet port for conveying material discharged through the outlet port to a position remote from the mobile bin. The rotary feeder comprises generally apparatus defining a cylindrical chamber, and a rotor mounted in said chamber having blades defining a plurality of pockets in the chamber. A passageway connects a discharge port of the bin with the pockets to allow material discharged from the bin to be loaded into said pockets, and means are provided for forcing gas under pressure through the pockets of the rotary feeder to entrain the material and carry it out of the feeder to a remote location.

The above apparatus, in itself, is capable of overcoming most of the disadvantages present with previously - proposed transportation - discharge apparatus. However, a large amount of power is necessarily consumed in entraining the material in the pockets of the rotary feeder, so that the entrained material can be carried out of the feeder. If the material is discharged from the mobile bin into the rotary feeder in compact masses, the power necessary to entrain the material in the feeder and carry it to the remote location is so large as to make the discharge operation extremely costly.

It has been found that if the material in the bin is delivered in an aerated condition through the discharge port to the rotary feeder, the necessary velocity of the gas supplied to the rotary feeder, and consequently the power that must be consumed during the discharge operation is appreciably reduced. Accordingly, the present invention contemplates providing within the bin one or more gas-permeable members having their upper or material-conveying surfaces forming at least portions of the bottom wall of the bin, the gas-permeable members being inclined with respect to the horizontal and having their lowermost ends positioned adjacent the discharge port, so as to discharge material from the gas-permeable members through the port. Each of the gas-permeable members has a plenum chamber extending along and beneath it into which a gas is forced so that the gas passes through the gas-permeable members and into the material supported thereby to aerate such material. The aerated material then flows downwardly along the upper surface of the gas-permeable members by gravity to a location above and opposite the discharge port where the material can be dropped into the rotary feeder for delivery to a pneumatic conveying system.

A preferred embodiment of the apparatus of the present invention will be more fully described in conjunction with the accompanying drawings.

In the drawings:

Fig. 1 is a vertical sectional view of a truck trailer embodying the present invention.

Fig. 2 is a vertical view, partly in section, taken on line 2—2 of Fig. 1;

Figure 3:
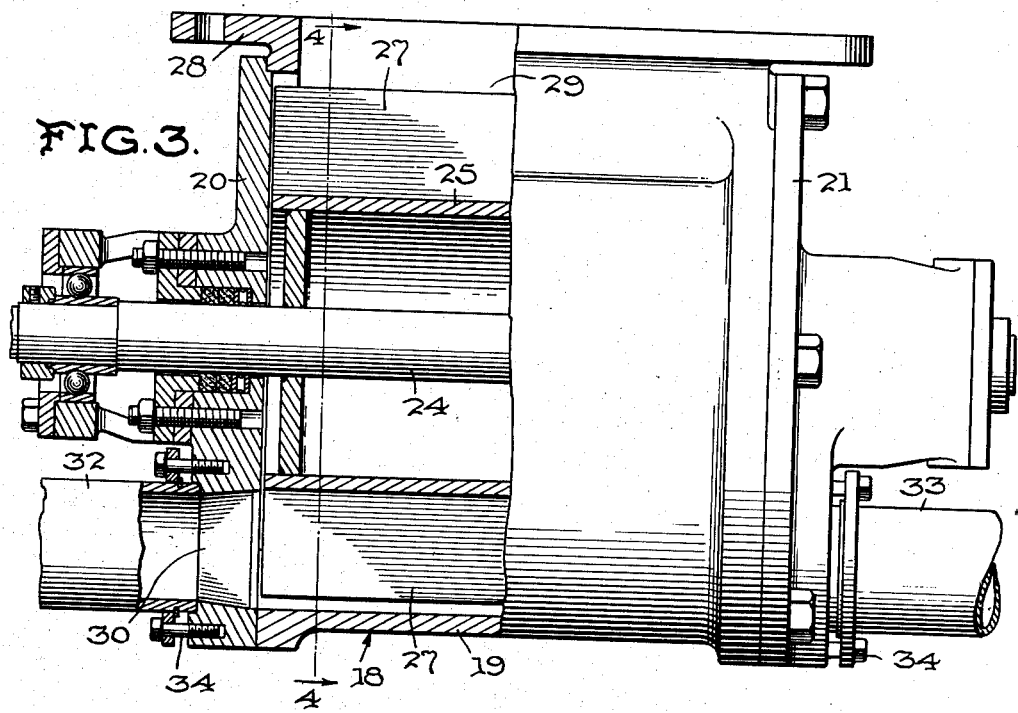
Fig. 3 is a vertical sectional view through the rotary feeder of the present invention.
Figure 4:
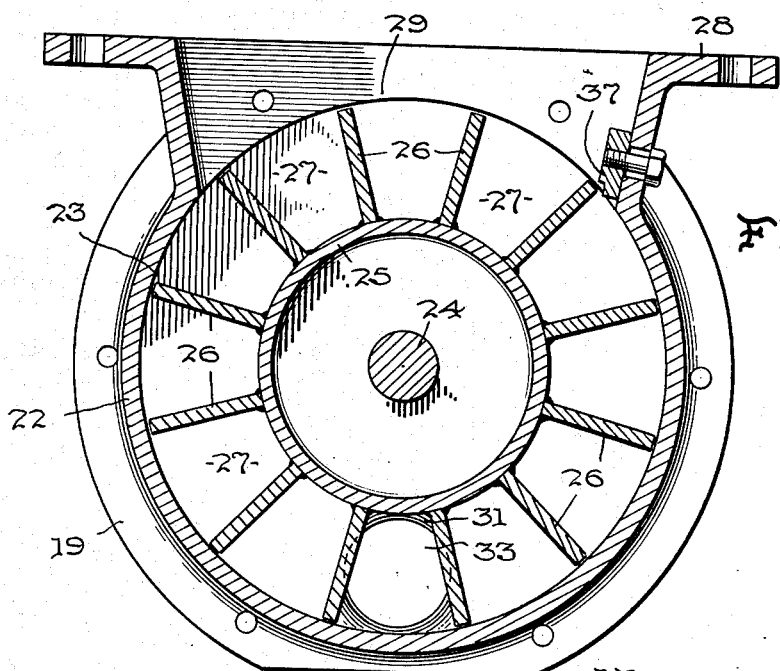
Fig. 4 is a sectional view taken on line 4—4 of Fig. 3.

The apparatus of the present invention comprises a mobile bin 1, shown as a truck trailer, having end walls 2 and 2', side walls 3 and 3', a top wall 4, and a bottom wall 5, all defining an enclosed storage space 6. A plurality of access ports or manholes 7 extend through the top wall of the trailer to permit material to be loaded into the trailer.

The lower wall of the trailer is formed in part by two sets of gas-permeable members 8, and 9 and 9'. The gas-permeable members are inclined with respect to the horizontal and extend between the end walls of the bin and a pair of discharge ports 10 and 10' positioned in the bottom wall 5. Flow-directing surfaces or walls 11 and 11' extend between side walls 3 and 3', respectively, and the adjacent sides of the adjacent gas-permeable members 8 and 8' and 9 and 9'. Another set of flow-directing surfaces 12 and 12' have their lower ends positioned adjacent the other sides of the gas-permeable members, and extend upwardly therefrom to form substantially an inverted V in cross-section. All of the flow-directing walls are inclined to the horizontal at an angle greater than the angle of repose of the pulverulent material to be transported in its unaerated state so that as long as there is any of the material in the storage space 6 it will flow downwardly along said walls onto the gas-permeable members during a discharging operation. Plenum chambers 13, and 14 and 14' extend along and beneath each of the gas-permeable members. Means 15 are provided for supplying gas under pressure to the plenum chambers to pass through the gas-permeable members and into material lying upon their upper or material-conveying surfaces to aerate such material. Such gas-supplying means may be carried by the vehicle and may be a permanent part thereof, or such means may be retained at remote locations at which material is to be discharged, and attached to the vehicle at such locations.

The term "aeration" is employed herein to mean penetration of any gas, not necessarily air, into the material above the gas-permeable members at sufficient speed to expand the material and thereby reduce the particle-to-particle friction, but not at a speed sufficient to entrain particles of material in the gas stream.

When a pulverulent material is aerated by passage of a gas through a horizontal permeable member into the material, the material forms a definite angle with respect to the gas-permeable member. This angle is termed the angle of repose of the aerated material and is substantially less than the angle of repose of the same material before aeration. If the gas-permeable member is inclined with respect to the horizontal at an angle at least as great as the angle of repose of the aerated material, aeration of the material will cause the material to flow by gravity along the conveying surface of the permeable member to the lowermost end thereof. The angle of repose of an aerated pulverulent material is dependent upon the characteristics of the particular material, and varies with different materials. However, it has been found that if the gas-permeable member has an inclination with respect to the horizontal of from about four degrees to about fifteen degrees, practically any material which may be aerated will, when aerated, flow down such a member by gravity. Accordingly, the gas-permeable members 8 and 8', and 9 and 9' preferably are so disposed that their upper or material-conveying surfaces form an angle with respect to the horizontal at least as great as the angle of repose of the material in its aerated state.

It is not necessary that air be used to aerate the material. The gas fed into the plenum chambers 13 and 13', and 14 and 14' usually will be a gas which is inert with respect to the particular material in the storage space 6. The gas may be also heated or refrigerated, and, in some cases, it may be a gas which is chemically reactive with the material, depending upon the particular material and the characteristic which it is to have when discharged from the trailer. The gas-permeable members advantageously are constructed of multi-ply canvas, but may be of any gas-permeable material having a permeability not substantially greater than 5.

The term "permeability" as herein employed, is defined as the amount of air measured in cubic feet at 20° F. and 25% relative humidity which will pass through an area of one square foot of dry, porous stone in one minute when tested under an equivalent pressure differential of two inches of water.

It has been found that porous material having a permeability of from about 5 down to and including zero, as determined by the above definition, is satisfactory for use as the gas-permeable members in the apparatus of the present invention and, accordingly, porous material having a permeability within that range is preferred for use with the present invention. In the case of some gas-permeable materials, the application of an air pressure differential of two inches w. g. may not cause a considerable volume of air to pass through the material, so that the permeability measured in accordance with the above definition would be zero. If such is the case, the resistance to gas flow of the gas-permeable material should be such that with an air flow of 4 C. F. M./sq. ft. through the uncovered medium, i. e., free of the material to be conveyed, a pressure differential of at least three inches of water across the gas-permeable material is produced.

An opening 16 extends through the end wall 2 of the trailer and allows gas forced through the gas-permeable members and into material thereon to exhaust into the surrounding atmosphere. A filter 17 is positioned in opening 16 to filter out and remove entrained material from the gas before it is exhausted from the trailer, so that the area surrounding the trailer will not be dusted with material of the type transported by the trailer. The filter 17 also filters out and removes foreign materials from air as it enters the trailer, so that material transported by the trailer will not be contaminated as the trailer is moving from one place to another. A pair of rotary feeders 18 and 18' are positioned opposite and beneath the discharge ports 10 and 10' adjacent the lower ends of the gas-permeable members. The feeders 18 and 18' are identical so that only one will be described, corresponding parts of the other feeder being identified with the same numerals primed. The feeders each include a casing 19 having end walls 20 and 21 and a side wall 22 defining a cylindrical chamber 23. Mounted on a horizontally-disposed shaft 24 within the casing is a rotor 25 having a plurality of blades 26 extending radially outwardly from the rotor towards the inner wall of the chamber 23. The distances between the outer ends of the blades and the wall of the casing defining the chamber are so small that no substantial amount of air or material can pass between the inner wall of the chamber and the outer ends of the blades. The rotor, the spaced blades, and the walls of the chamber, define a plurality of pockets 27, for receiving finely-divided material from the truck-trailer and delivering it to a pneumatic line as hereinafter described.

The casing 19 of the rotary feeder has horizontal flanges 28 at its upper side which are bolted to the bottom of the trailer about the discharge port 10. The upper portion of the casing has a passageway 29 through which material passing through the discharge port 10 falls by gravity into the several pockets 27 as the rotor rotates.

A pair of aligned passages 30 and 31 extend through the lower portions of the end walls 20 and 21, respectively, of the rotary feeder and register, serially, with the several pockets 27 as the rotor rotates. Preferably, the inner ends of the passages 30 and 31 are at least as large in cross-section in all dimensions as the cross-sections of the pockets. The outer ends of the passages are of different shape and cross-section than the inner ends of the passages, and are of a shape appropriate for connection to hoses or tubings 32 and 33, preferably of circular cross-section, which are utilized to supply gas under pressure to the rotary feeder, and to remove gas and gas-entrained material from the feeder, respectively. Coupling means 34 are provided for connecting the tubings 32 and 33 to the outer ends of the passages 30 and 31. A conduit 38 is provided for connecting the tubings 32' and 33 of the rotary feeders 18' and 18. Gas supply means 35 for delivering gas under pressure, preferably, though not necessarily, air, are provided. Such means may be carried by the trailer and may be permanently attached thereto, or may be retained at the discharge location and applied to the trailer when it arrives at such locations for discharge of its contents.

The pressure to be supplied to the passages 30 and 31 of the rotary feeder is determined by the material-to-air-ratio which is desired, and by the distance through which the material must be conveyed from the trailer to the location at which the material is to be stored or packaged. Such pressure may be different at different locations and under different circumstances.

An electrical or other motor 36 is provided for imparting rotation to shafts 24 and 24' of the rotary feeders to cause rotation of the rotors during a discharge operation. The rotational speed of the rotors will be determined by the rate of feed of material into the rotary feeders and into the lines 33 and 33', by the material-to-air-ratio desired, by the lateral dimensions of the gas-permeable members within the trailer, and by the pressure at which gas is admitted to the plenum chambers 13 and 13' and 14 and 14'. The motor 36 for imparting rotation to the rotors of the rotary feeders may be carried by the trailer and form a permanent part thereof, or it may be retained at discharge locations and applied to the trailer, as desired. Moreover, separate motors for imparting rotation to each of the feeders 18 and 18' may be utilized, so that one speed might be imparted to one feeder and another speed to the other feeder.

Although the trailer 1 is shown with two sets of gas-permeable members 8 and 8' and 9 and 9', in some instances a single set only of gas-permeable members may be used and a single discharge port provided at the discharge end of such set of gas-permeable members.

A cutter bar 37 is mounted in the neck of the casing forming the passage 29 of each of the rotary feeders adjacent one edge thereof. The cutter bar is provided to cut any paper, string or other foreign material that otherwise might jam between the ends of the blades and the wall of the chamber 23 and thus interfere with rotation of the rotor 25. The cutter bar is so positioned with respect to the passage 29 into the rotary feeder that the blades pass by the cutter bar only after they have passed the full extent of the passage.

In operation of the apparatus above described, when the material is to be discharged from the trailer at a discharge location, the means 15 for supplying gas under pressure to the plenum chambers 13 and 13' and 14 and 14' is actuated, and gas from such means flows into the plenum chambers and through the gas-permeable members 8 and 8' and 9 and 9' into the material on the upper material-conveying surfaces thereof. The gas aerates the material above the upper material-conveying surfaces of the gas-permeable members, and the material flows downwardly along the gas-permeable members by gravity to the discharge ports 10 and 10'. As the material directly above the gas-permeable members flows to the discharge ports, other material in the storage space 6 flows downwardly along the material-directing surfaces 11 and 11' and 12 and 12' onto the upper material-conveying surfaces of the gas-permeable members. Material delivered to each of the discharge ports 10 and 10' drops through the feed passage 29 into the pocket 27 of the rotary feeders 18 and 18'. The motor 36 for imparting rotation to the rotors of the rotary feeders is then actuated, and the rotor rotates, exposing each of the pockets successively to the feed passage 29 so that each pocket as it rotates past the passage receives its load of aerated material from the discharge port 10 of the trailer. The rotation of the pockets carries aerated material therein downwardly until the pockets register with the passages 30 and 31 of the rotary feeders. Gas under pressure supplied to the rotary feeders blows the material in the pocket registering with the passages of feeder 18 out of the pocket into the conduit 38 wherein the material and gas mixture then enters the rotary feeder 18'. The material and gas mixture from feeder 18 blows the material in the pocket registering with the passages of feeder 18' out of the pocket into the tubing 33' and to the remote location at which the material is to be stored or packaged.

In the normal operation, the rotary feeders will be operated at the speed necessary to cause each feeder to discharge one-half the material required per cubic foot of conveying air to produce the material-to-air ratio desired in the conveying system. Thus, the air leaving the rotary feeder 18 through tubing 18' through tube 33' will contain the necessary amount of material to give the desired material-to-air ratio.

While the present invention has been described in conjunction with a preferred embodiment thereof, it is obvious that many changes could be made in the apparatus without departing from the scope of the invention. For example, though a mobile bin has been described, specifically a truck trailer, the apparatus of the present invention could advantageously be employed with a stationary bin. Accordingly, the invention is not to be considered limited to the apparatus specifically shown and described, but is rather limited only by the scope of the appended claims.

I claim:

1. Apparatus for storing and discharging pulverulent material comprising a bin, a discharge port in the bottom wall of said bin, means for aerating material in the bin and delivering it to said discharge port in an aerated state, a rotary feeder positioned adjacent said discharge port and including a casing having end walls and a side wall defining an enclosed cylindrical chamber, a rotor in said chamber rotatable about a horizontally disposed axis, said rotor having a plurality of blades thereon spaced around its periphery and extending radially outward therefrom to adjacent the inner wall of said chamber, said rotor, rotor blades, and casing defining a plurality of pockets open at the side remote from the rotor axis and at the sides thereof normal to the rotor axis, said feeder having a feeder passageway at the upper side thereof leading to said chamber for registry with said discharge port to permit delivery of material in an aerated state from the bin through said discharge port and said passageways into said pockets, means for admitting gas under pressure through one of said end walls into said chamber generally parallel to the axis thereof, means for removing the gas from said chamber through the opposite end wall thereof, the flow of gas into said chamber being substantially aligned with the flow of gas out of the chamber, the places of admission of gas into said chamber and exit of gas from said chamber being spaced arcuately from said feeder passageway and so positioned with respect to said rotor as to register serially with the open axial sides of each of said pockets as said rotor rotates, whereby material in said bin is delivered in an aerated state through such discharge port into said pockets of the rotary feeder as the rotor rotates and material in the feeder pockets is blown therefrom as the pockets pass said gas-admission and gas-removal means.

2. Apparatus as defined in claim 1 in which the places of admission of gas into said chamber and exit of gas therefrom have a radial dimension at least as great as the maximum radial dimension of any of said pockets.

3. Apparatus for storing and discharging pulverulent material comprising a bin, at least one gas-permeable member having an upper material-conveying surface forming at least a portion of the bottom wall of the bin, a discharge port in the bottom wall of the bin, said gas-permeable member being inclined with respect to the horizontal with its lowermost end adjacent said discharge port, means for directing material in the bin onto the upper material-conveying surface of said gas-permeable member, a plenum chamber extending along and beneath the gas-permeable member, means for introducing a gas into the plenum chamber to pass through the gas-permeable member and into material on the upper material-conveying surface thereof to aerate such material, a rotary feeder positioned adjacent said discharge port and including a casing having end walls and a side wall defining an enclosed cylindrical chamber, a rotor in said chamber rotatable about a horizontally disposed axis, said rotor having a plurality of blades thereon spaced around its periphery and extending radially outward therefrom to adjacent the inner wall of said chamber, said rotor, rotor blades, and casing defining a plurality of pockets open at the side remote from the rotor axis and at the sides thereof normal to the rotor axis, said feeder having a feeder passageway at the upper side thereof leading to said chamber for registry with said discharge port to permit delivery of material from the bin through said passageway into said pockets, means for admitting gas under pressure through one of said end walls into said chamber generally parallel to the axis thereof, means for removing the gas from said chamber through the opposite end wall thereof, the flow of gas into said chamber being substantially aligned with the flow of gas out of the chamber, the places of admission of gas into said chamber and exit of gas from said chamber being spaced arcuately from said feeder passageway and so positioned with respect to said rotor as to register serially, with the open axial sides of each of said pockets and for a radial dimension at least as great as the maximum radial dimension of any of said pockets, whereby material in the bin is delivered in an aerated state through the discharge port into said pockets of the rotary feeder as the rotor rotates and material in the feeder pockets is blown therefrom as the pockets pass said gas-admission and gas-removal means.

4. Apparatus as defined in claim 3 having means carried by said rotary feeder adjacent said feeder passageway for scraping foreign material from the axially-extending outer edges of the blades as they pass said feeder passageway.

5. Apparatus as defined in claim 3 in which said gas-admission and said gas-removal means include a pair of aligned passageways extending generally parallel to the axis of the chamber, said pair of passageways extending through opposite end walls of the casing into communication with said chamber, the inner end of each of said pair of passageways has a radial dimension at least as great as the maximum radial dimension of any of said pockets.

6. Apparatus as defined in claim 5 in which the cross sectional dimensions of the inner end of each passageway of said pair of passageways are at least as great in all directions as the corresponding dimensions of the cross-sections of said pockets taken in a direction normal to the axis of the rotor.

7. Apparatus for storing and discharging pulverulent material comprising a bin, a pair of aligned discharge ports in the bottom of said bin, means for aerating material in the bin and delivering it to said discharge ports in an aerated state, a rotary feeder positioned beneath each of said discharge ports, each rotary feeder including a casing having end walls and a side wall defining an enclosed cylindrical chamber, a rotor in said chamber rotatable about a horizontally disposed axis, said rotor having a plurality of blades thereon spaced around its periphery and extending radially outward therefrom to adjacent the inner wall of said chamber, said rotor, rotor blades, and casing defining a plurality of pockets open at the side remote from the rotor axis and at the sides thereof normal to the rotor axis, each rotary feeder having a feeder passageway at the upper side thereof leading to said chamber for registry with its respective discharge port to permit delivery of material from the bin through said passageway into said pockets, means for admitting gas under pressure through one end wall of each rotary feeder into the chamber thereof generally parallel to the axis thereof, means for removing the gas from said chambers through the opposite end walls thereof, the flow of gas into said chambers being substantially aligned with the flow of gas out of said chambers and so positioned with respect to said rotors as to register serially with the open axial side of each pocket of each rotor as said rotors rotate, a conduit connecting the gas-removing means of one said rotary feeder with the gas-admitting means of the other said rotary feeder, whereby material in the bin is delivered in an aerated state through the discharge ports into said pockets of the rotary feeders as the rotors rotate and material in the feeder pockets is blown therefrom as the pockets pass said gas-admission and gas-removal means.

8. Apparatus as defined in claim 7 having means carried by each of said rotary feeders adjacent said feeder passageways for scraping foreign material from the axially-extending outer edges of the blades as they pass said feeder passageway.

9. Apparatus as defined in claim 7 in which said gas-admission and said gas-removal means each include a pair of aligned passageways extending generally parallel to the axis of the respective chambers with which they communicate, each of said pairs of passageways extending through opposite end walls of the respective casings into communication with the chamber thereof, the inner ends of each of the passageways of said respective pairs of passageways having a radial dimension at least as great as the maximum radial dimensions of any of said pockets, the outer ends of each passageway of said pairs of passageways having cross-sectional shapes different from the cross-sectional shapes of the inner ends of each passageway of said pairs of passageways for connection to a conduit of corresponding cross-sectional shape.

10. Apparatus as defined in claim 9 in which the cross sectional dimensions of the inner end of each passageway of said pairs of passageways are at least as great in all directions as the corresponding dimensions of the cross-sections of said pockets, the outer ends of each of said pair of passageways are circular in cross-section for connection to cylindrical conduits, and each passageway of said pairs of passageways is positioned diametrically opposite the respective feeder passageway leading to the rotary feeder.

References Cited in the file of this patent

UNITED STATES PATENTS

| Number | Name | Date |
|---|---|---|
| 1,321,262 | Townsend | Nov. 11, 1919 |
| 1,390,974 | Von Porat | Sept. 13, 1921 |
| 2,011,133 | Yoss | Aug. 13, 1935 |
| 2,152,632 | Cassiere | Apr. 4, 1939 |
| 2,244,050 | Cassiere | June 3, 1941 |
| 2,413,293 | Colburn | Dec. 31, 1946 |
| 2,589,968 | Schemm | Mar. 18, 1952 |
| 2,652,687 | Yellott | Sept. 22, 1953 |